(12) United States Patent
Kaneda et al.

(10) Patent No.: US 8,039,087 B2
(45) Date of Patent: Oct. 18, 2011

(54) HONEYCOMB STRUCTURE

(75) Inventors: Atsushi Kaneda, Kasugai (JP); Naoshi Masukawa, Nishikasugai-gun (JP); Shuichi Ichikawa, Handa (JP)

(73) Assignee: NGK Insulators, Ltd., Nagoya (JP)

( * ) Notice: Subject to any disclaimer, the term of this patent is extended or adjusted under 35 U.S.C. 154(b) by 56 days.

(21) Appl. No.: 12/314,234

(22) Filed: Dec. 5, 2008

(65) Prior Publication Data

US 2009/0098336 A1 Apr. 16, 2009

Related U.S. Application Data

(62) Division of application No. 10/533,449, filed as application No. PCT/JP03/14185 on Nov. 7, 2003.

(30) Foreign Application Priority Data

Nov. 7, 2002 (JP) .................................. 2002-323271

(51) Int. Cl.
*B32B 3/12* (2006.01)
*B32B 3/00* (2006.01)
*B32B 3/26* (2006.01)

(52) U.S. Cl. .................... 428/116; 428/304.4; 428/34.5; 55/483

(58) Field of Classification Search .................... None
See application file for complete search history.

(56) References Cited

U.S. PATENT DOCUMENTS

| 4,327,188 A * | 4/1982 | Endo et al. .................... 501/134 |
| 4,904,625 A | 2/1990 | Shaffer |
| 5,595,581 A * | 1/1997 | Ichikawa et al. ................ 55/302 |
| 2003/0140608 A1* | 7/2003 | Hamanaka et al. ............ 55/523 |
| 2003/0165662 A1 | 9/2003 | Suwabe et al. |
| 2004/0101654 A1* | 5/2004 | Hijikata ........................ 428/116 |
| 2005/0153099 A1 | 7/2005 | Yamada |

FOREIGN PATENT DOCUMENTS

| EP | 1 184 066 A1 | 3/2002 |
| EP | 1 251 247 A1 | 10/2002 |
| EP | 1251247 | * 10/2002 |

(Continued)

OTHER PUBLICATIONS

Knudsen, "Dependence of Mechanical Strength of Brittle Polycrystaline Specimens on Porosity and Grain Size", Journal of the American Ceramic Society, vol. 42, No. 8, Aug. 1959, pp. 376-387.*

Spriggs, "Expression for Effect of Porosity on Elastic Modulus of Polycrystalline Refractory Materials, Particularly Aluminum Oxide", Journal of the American Ceramic Society, Dec. 1961, pp. 628-629.*

(Continued)

*Primary Examiner* — David Sample
*Assistant Examiner* — Nicole Gugliotta
(74) *Attorney, Agent, or Firm* — Oliff & Berridge, PLC

(57) ABSTRACT

There is disclosed a honeycomb structure 1 having a plurality of cells 4 partitioned by cell walls 2 to function as fluid passages, a predetermined cell 4 being plugged by a plugging material at one end face, a remaining cell 4 being plugged by the plugging material at the other end face, wherein a Young's modulus of the plugging material is lower than that of the cell wall 2. A strength of the plugging material is lower than that of the cell wall. A porosity of the plugging material is 97% or more of that of the cell wall. There is provided a honeycomb structure whose end face is not easily cracked and which is superior in durability.

15 Claims, 2 Drawing Sheets

FOREIGN PATENT DOCUMENTS

| | | |
|---|---|---|
| EP | 1 293 241 A2 | 3/2003 |
| EP | 1 342 494 A1 | 9/2003 |
| EP | 1 500 799 A1 | 1/2005 |
| JP | U-61-62217 | 4/1986 |
| JP | A-01-145378 | 6/1989 |
| JP | A-07-332064 | 12/1995 |
| JP | A-2002-219319 | 8/2002 |
| JP | A-2002-239322 | 8/2002 |
| WO | WO02/074417 A1 * | 9/2002 |
| WO | WO02/081880 A1 * | 10/2002 |

OTHER PUBLICATIONS

Luo et al., "Porosity-dependence of elastic moduli and hardness of 3Y-TZP ceramics", Ceramics International 25 (1999) 281-286.*

Roberts et al. "Elastic Properties of Model Porous Ceramics", Journal of the American Ceramic Society, vol. 83, No. 12, 3041-3048, 2000.*

Jun. 23, 2010 Office Action issued in U.S. Appl. No. 10/533,449.

Dec. 22, 2010 Office Action issued in U.S. Appl. No. 10/533,449.

* cited by examiner

HONEYCOMB STRUCTURE

This is a Division of application Ser. No. 10/533,449 filed May 2, 2005, which in turn is a National Phase of Application No. PCT/JP03/14185 filed Nov. 7, 2003, which claims the benefit of Japanese Application No. 2002-323271 filed Nov. 7, 2002. The disclosure of the prior applications is hereby incorporated by reference herein in their entirety.

TECHNICAL FIELD

The present invention relates to a honeycomb structure. More specifically, the present invention relates to a honeycomb structure which hardly has a crack at each end face and which is superior in durability.

BACKGROUND ART

A honeycomb structure in which predetermined cells are plugged by a plugging material has heretofore been used as a filter (e.g., a diesel particulate filter: DPF) for trapping/removing particulate matters included in dust-containing fluids such as an exhaust gas exhausted from a diesel engine (see Japanese Patent Application Laid-Open No. JP-A-7-332064, for example). Moreover, in recent years, porosities of partition walls of the honeycomb structure have been increased in order to reduce a pressure loss in treating the exhaust gas in the honeycomb structure and to treat the exhaust gas more efficiently (see Japanese Patent Application Laid-Open No. JP-A-2002-219319, for example). However, to proceed with the increases of the porosities of the partition walls of the honeycomb structure, as shown in FIG. 2, there has been a problem that cracks 5 are easily generated in cell walls 2 of an end portion (end face) of a honeycomb structure 1. A honeycomb structure 1 shown in FIG. 2 has a plurality of cells 4, each cell 4 being surrounded by cell walls 2 and functioning as a fluid passage. Predetermined cells 4 are plugged by a plugging material at one end face to form plug portion 3. Remaining cells 4 are plugged by the plugging material at the other end face (not shown).

DISCLOSURE OF THE PRESENT INVENTION

The present invention has been developed in consideration of the above-described problem and aims to provide a honeycomb structure whose end face is not easily cracked and which is superior in durability.

According to the present invention, following honeycomb structure is provided.

[1] A honeycomb structure comprising a plurality of cells, each cell being surrounded by cell walls and functioning as a fluid passage, predetermined cells being plugged by a plugging material at one end face, remaining cells being plugged by the plugging material at the other end face, wherein a Young's modulus of the plugging material is lower than that of the cell wall (the first aspect of the present invention).

[2] The honeycomb structure according to [1], wherein a porosity of the plugging material is 97% or more with respect to a porosity of the cell wall.

[3] The honeycomb structure according to [1], wherein a porosity of the plugging material is 105% or more with respect to the porosity of the cell wall.

[4] The honeycomb structure according to any of [1] to [3], wherein the porosity of the cell wall is 46% or more.

[5] The honeycomb structure according to any of [1] to [4], wherein a thickness of the cell wall is 400 μm or less.

[6] The honeycomb structure according to any of [1] to [5], wherein a material for the cell wall is porous ceramic.

[7] The honeycomb structure according to any of [1] to [6], wherein the plugging material comprises silicon carbide.

[8] The honeycomb structure according to any of [1] to [7], wherein the predetermined cells plugged at one end face and the remaining cells plugged at the other end face are arranged alternately so as to form checkerboard patterns at the end faces.

[9] A honeycomb structure comprising a plurality of cells, each cell being surrounded by cell walls and functioning as a fluid passage, predetermined cells being plugged by a plugging material at one end face, remaining cells being plugged by the plugging material at the other end face, wherein a strength of the plugging material is lower than that of the cell wall (the second aspect of the present invention).

[10] The honeycomb structure according to [9], wherein a porosity of the plugging material is 97% or more with respect to a porosity of the cell wall.

[11] The honeycomb structure according to [9], wherein a porosity of the plugging material is 105% or more with respect to the porosity of the cell wall.

[12] The honeycomb structure according to any of [9] to [11], wherein the porosity of the cell wall is 46% or more.

[13] The honeycomb structure according to any of [9] to [12], wherein a thickness of the cell wall is 400 μm or less.

[14] The honeycomb structure according to any of [9] to [13], wherein a material for the cell wall is porous ceramic.

[15] The honeycomb structure according to any of [9] to [14], wherein the plugging material comprises silicon carbide.

[16] The honeycomb structure according to any of [9] to [15], wherein the predetermined cells plugged at one end face and the remaining cells plugged at the other end face are arranged alternately so as to form checkerboard patterns at the end faces.

[17] A honeycomb structure comprising a plurality of cells, each cell being surrounded by cell walls and functioning as a fluid passage, predetermined cells being plugged by a plugging material at one end face, remaining cells being plugged by the plugging material at the other end face, wherein a porosity of the plugging material is 97% or more with respect to a porosity of the cell wall (the third aspect of the present invention).

[18] The honeycomb structure according to [17], wherein a porosity of the plugging material is 105% or more with respect to the porosity of the cell wall.

[19] The honeycomb structure according to [17] or [18], wherein the porosity of the cell wall is 46% or more.

[20] The honeycomb structure according to any of [17] to [19], wherein a thickness of the cell wall is 400 μm or less.

[21] The honeycomb structure according to any of [17] to [20], wherein a material for the cell wall is porous ceramic.

[22] The honeycomb structure according to any of [17] to [21], wherein the plugging material comprises silicon carbide.

[23] The honeycomb structure according to any of [17] to [22], wherein the predetermined cells plugged at one end face and the remaining cells plugged at the other end face are arranged alternately so as to form checkerboard patterns at the end faces.

BEST MODE FOR CARRYING OUT THE INVENTION

In a honeycomb structure of the present invention, a Young's modulus of a plugging material is set to be lower than that of a cell wall. Therefore, when a stress is applied on an end face of the honeycomb structure, the cell wall is distorted, and the plugging material is also similarly distorted. Accordingly, since partial stress concentration on the cell wall is relaxed, the cell wall can be inhibited from being cracked (first aspect of the present invention). Moreover, a strength of the plugging material is set to be lower than that of the cell wall. Therefore, when the stress is applied on the end face of the honeycomb structure, the strength of the cell wall is high, and the wall is not cracked by the plugging material. Furthermore, the plugging material is distorted before the cell wall is cracked, and the cell wall can be inhibited from being cracked (second aspect of the present invention). Additionally, since a porosity of the plugging material is set to 97% or more of a porosity of the cell wall, the Young's modulus of the plugging material becomes lower than that of the cell wall. Since the strength of the plugging material becomes lower than that of the cell wall, the cell wall can be inhibited from being cracked (third aspect of the present invention).

Embodiments of the present invention (first, second, and third aspects) will be described hereinafter concretely with reference to the drawings, but the present invention is not limited to the following embodiments, and it should be understood that modification on design, improvement or the like is appropriately added based on ordinary knowledge of any person skilled in the art within a range which does not deviate from the scope of the present invention.

Figure 1:
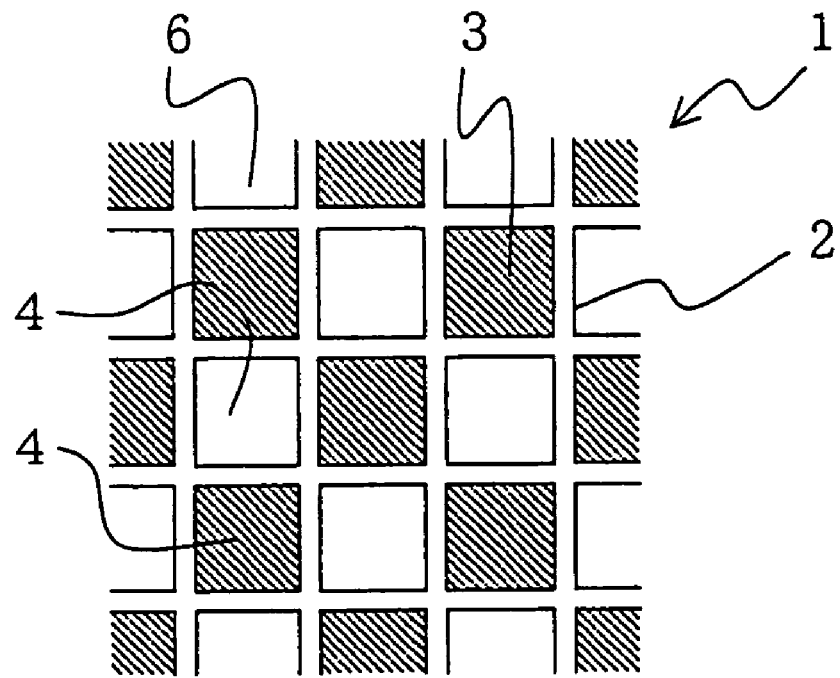
FIG. 1 is a plan view showing a part of an end face in an embodiment of a honeycomb structure of the present invention.

FIG. 1 shows an embodiment of a honeycomb structure of a first aspect of the present invention (hereinafter sometimes referred to simply as "the first aspect"), and is a plan view in which a part of an end face of the honeycomb structure is enlarged. As shown in FIG. 1, there is provided a honeycomb structure 1 comprising a plurality of cells 4. Each cell is surrounded by cell walls 2 and functions as a fluid passage. Predetermined cells 4 are plugged by a plugging material at one end face to form plug portion 3. Remaining cells 4 are plugged by the plugging material at the other end face (not shown). A Young's modulus of the plugging material is lower than that of the cell wall 2. At one end face 6 and the other end face (not shown) of the honeycomb structure 1, the plugged cell and open cell are arranged alternately so as to form checkerboard patterns at the end faces.

The Young's modulus of the plugging material is set to be lower than that of the cell wall 2 in this manner. Therefore, when a stress is added to the end face of the honeycomb structure 1, the plug portion 3 is also distorted in the same manner as in the cell wall 2, and partial stress concentration onto the cell wall 2 is accordingly relaxed. Therefore, the cell wall 2 can be inhibited from being cracked, and durability can be enhanced. Examples of a case where the stress is added to the end face of the honeycomb structure 1 include: a case where a thermal stress due to a temperature difference or the like is added to the end face when heating the honeycomb structure to regenerate the structure by burning soot; a case where the thermal stress is generated in the end face by an influence of a temperature distribution in a firing furnace or heat generated by combustion of a pore forming agent or the like in a firing step during a manufacturing process; and the like. Even when the honeycomb structure is laid horizontally and fired with a longitudinal direction directed in a horizontal direction, a load of the plug portion is applied to the cell wall of the honeycomb structure, and a stress is sometimes added to the end face.

The honeycomb structure of the first aspect of the present invention is preferably used in a case where the porosity of the cell wall is 46% or more. That is, the honeycomb structure of the first aspect is an invention which has been developed in order to address a problem that the cell wall is easily cracked because of a high porosity of the cell wall of the honeycomb structure in recent years, and the invention brings about a large effect on a honeycomb structure in which the porosity is 46% or more and which is more easily cracked. The honeycomb structure of the first aspect is preferably used in a case where a thickness of the cell wall is 400 µm or less. When the thickness of the cell wall decreases, the cell wall is easily cracked. Therefore, a larger effect is brought in the honeycomb structure whose cell wall has a thickness of 400 µm or less and is more easily cracked.

A material for the cell wall 2 is preferably porous ceramic for use as filters such as a DPF. As the porous ceramic, at least a type of ceramic selected from a group consisting of cordierite, mullite, alumina, spinel, silicon carbide, silicon nitride, lithium aluminum silicate, and aluminum titanate or the like is usable. Silicon carbide is preferable in that thermal conductivity is high and heat is easily radiated.

There is no particular restriction as to a shape of the honeycomb structure, and the structure is, for example, a columnar structure with the end face shown in FIG. 1 being a bottom face, and a cross-sectional shape (shape of the bottom face) of the honeycomb structure vertical to a central axis of the columnar structure is a polygonal shape such as a tetragonal shape, a circular shape, an elliptic shape, an oblong shape, a modified shape or the like. There is no particular restriction as to the cross-sectional shape of the cell, and the shape is triangular, tetragonal, hexagonal, circular or the like.

In the present invention, there is no particular restriction as to a cell density of the cells formed by cell walls. However, too small a cell density results in a filter of insufficient strength and insufficient effective GSA (geometrical surface area); too large a cell density results in a large pressure loss when a subject fluid passes. The cell density is in a range of preferably 6 to 2,000 cells/in.$^2$ (0.9 to 311 cells/cm$^2$), more preferably 50 to 1,000 cells/in.$^2$ (7.8 to 155 cells/cm$^2$), most preferably 100 to 400 cells/in.$^2$ (15.5 to 62.0 cells/cm$^2$).

The porosity of the plugging material is preferably 97% or more of that of the cell wall 2. When the porosity is lower than 97%, the Young's modulus of the plugging material is sometimes higher than that of the cell wall 2. The porosity of the plugging material is further preferably 105% or more of that of the cell wall 2 so that the present invention becomes more effective.

The same material as that of the cell wall 2 is usable as the plugging material. When the plugging material is a silicon carbide material, the end face of the honeycomb structure is sometimes cracked because of a high Young's modulus of the silicon carbide material. However, when the Young's modulus is lowered for use by the increase of the porosity or the like, the end face of the honeycomb structure can be inhibited from being cracked.

A length (depth) of the plug portion 3 in a longitudinal direction of the honeycomb structure is preferably 1 to 20 mm. When the length is shorter than 1 mm, the strength of the plugging material remarkably drops. When the length is longer than 20 mm, a pressure loss of the filter increases.

A method of manufacturing the honeycomb structure of the first aspect of the present invention will be described hereinafter.

A ceramic raw material, a pore forming agent, a surface active agent, water and the like are mixed, and subsequently kneaded using a vacuum kneading machine to prepare clay having plasticity. Moreover, after the clay is extruded to prepare a formed body having a plurality of cell structures (honeycomb structures), the formed body is dried to prepare a ceramic formed body of the honeycomb structure.

As a type of the ceramic raw material, a desired (honeycomb structure forming) ceramic raw material is used. For example, when the honeycomb structure of silicon carbide is prepared, a mixture of SiC and metal Si powders is usable.

There is no particular restriction as to a type of the pore forming agent, but the examples include graphite, flour, starch, phenol resin, polymethyl methacrylate, polyethylene, polyethylene terephthalate, foamed resin, shirasu balloon, fly ash balloon and the like. When the type or added amount of the pore forming agent is changed, the porosity or Young's modulus of a partition wall of a ceramic formed body (cell wall of the honeycomb structure) can be controlled. The added amount of the pore forming agent is preferably 0.5 to 30 parts by mass with respect to 100 parts by mass of the ceramic raw material.

There is no particular restriction as to a type of the surface active agent, but the examples include ethylene glycol, dextrin, fatty acid soap, polyalcohol and the like. The added amount of the surface active agent is preferably 0.1 to 5 parts by mass with respect to 100 parts by mass of the ceramic raw material.

The added amount of water is usually about 25 to 45 parts by mass with respect to 100 parts by mass of the ceramic raw material.

In addition to the ceramic raw material, pore forming agent, surface active agent, and water, methyl cellulose, hydroxypropoxyl methyl cellulose, polyethylene oxide, hydroxypropyl methyl cellulose, hydroxyethyl cellulose, carboxyl methyl cellulose, polyvinyl alcohol and the like may be added.

The extrusion can be performed, for example, using a ram type extruder, twin screw type continuous extruder or the like. At the time of the extrusion, the formed body having a desired honeycomb structure can be prepared using a die having a desired cell configuration, cell wall thickness, and cell density.

There is no particular restriction as to a drying method of the formed body after extrusion, but the examples include hot air drying, microwave drying, dielectric drying, reduced-pressure drying, vacuum drying, freezing drying and the like. Above all, the dielectric drying, microwave drying, and hot air drying are preferably performed alone or combined. As drying conditions, the drying is preferably performed at 80 to 150° C. for ten minutes to one hour.

To obtain the raw material for the plugging material, a ceramic raw material, a pore forming agent, a surface active agent, water and the like can be mixed in a slurry, and subsequently kneaded using a mixer or the like.

As the type of the ceramic raw material for use in the raw material for the plugging material, a material forming a desired plugging material is used. For example, with silicon carbide, a mixture of SiC and metal Si powders is usable. Preferably the same material as the ceramic raw material for use in preparing the ceramic formed body of the honeycomb structure is used. The silicon carbide material is also usable as the raw material for the plugging material.

There is no particular restriction as to the type of the pore forming agent for use in the raw material for the plugging material, but the examples include graphite, flour, starch, phenol resin, polymethyl methacrylate, polyethylene, polyethylene terephthalate, foamed resin, shirasu balloon, fly ash balloon and the like. The foamed resin or fly ash balloon is preferable because an amount of heat generated at a degreasing time is small. When the type or added amount of the pore forming agent is changed, the porosity or Young's modulus of the plugging material can be controlled. The added amount of the pore forming agent is preferably 0.1 to 20 parts by mass with respect to 100 parts by mass of the ceramic raw material for use in the raw material for the plugging material.

There is no particular restriction as to the type of the surface active agent for use in the raw material for the plugging material, but the examples include ethylene glycol, dextrin, fatty acid soap, polyalcohol and the like.

As the raw material for the plugging material, in addition to the ceramic raw material, pore forming agent, surface active agent, and water, methyl cellulose, hydroxypropoxyl methyl cellulose, polyethylene oxide, hydroxypropyl methyl cellulose, hydroxyethyl cellulose, carboxyl methyl cellulose, polyvinyl alcohol and the like may be used.

Next, in one end face of the obtained ceramic formed body of the honeycomb structure (one end face of the honeycomb structure), some of the cells are masked, the end face is immersed in a reservoir container in which the plugging material is pooled, the plugging material is inserted in non-masked cells, and the plug portions are formed. Furthermore, in the other end face of the honeycomb structure, the cells (remaining cells) which have not been masked in the one end face are masked, the end face is immersed in the reservoir container in which the plugging material is pooled, the plugging material is inserted in the non-masked cells, and the plug portions are formed. At this time, the cell in which the plug portion is formed is disposed alternately with the cell in which the plug portion is not formed, and checkered patterns are formed in the opposite end faces. The checkered patterns are preferably formed in the opposite end faces, but even when the checkered patterns are not formed, the effect of the honeycomb structure of the present invention is fulfilled.

There is no particular restriction as to the masking method. There can be mentioned, for example, a method of attaching an adhesive film to the whole area of an end face of the honeycomb structure and making holes partially in the adhesive film. Specifically, there can be suitably used, for example, a method of attaching an adhesive film to the whole area of an end face of the honeycomb structure and then making holes, by a laser, only in those areas of the film corresponding to the cells in which plugged portions need be formed. As the adhesive film, there can be suitably used, for example, one obtained by coating an adhesive to one side of a film of polyester, polyethylene or thermosetting resin.

The ceramic formed body of the honeycomb structure whose opposite end faces are plugged in the checkered patterns is dried at 80 to 150° C. for five minutes to two hours. After dried, the body is degreased at 200 to 1000° C. for one to ten hours in the ambient atmosphere. Thereafter, the body is fired at 1300 to 2300° C. for one to five hours in an argon inert atmosphere to prepare the honeycomb structure of the present embodiment which is plugged with the plugging material.

At the firing time, when the Young's modulus of the plugging material of the honeycomb structure is higher than that of the cell wall, and when a thermal stress due to a temperature difference at the firing time is generated in the end face of the honeycomb structure, partial stress concentration occurs in the cell wall without relaxing the distortion of the cell wall, and the cell wall is sometimes cracked. Therefore, the Young's modulus of the plugging material needs to be lower than that of the cell wall.

Moreover, also when dividing/multiplying of the plugging material is smaller than that of the cell wall at the firing time, the stress due to the difference of the dividing/multiplying is generated in the end face of the honeycomb structure, the partially concentrated stress is generated in the cell wall, and therefore the cell wall is sometimes cracked. Therefore, the Young's modulus of the plugging material needs to be set to be lower than that of the cell wall. Here, the dividing/multiplying is a value representing expansion/contraction before/after the firing, and can be obtained by (length before the firing)/(length after the firing).

With respect to a yield at a manufacturing time in the manufacturing of the honeycomb structure of the present embodiment, the porosity of the plugging material is preferably 97% or more of that of the cell wall, further preferably 105% or more. When the porosity is lower than 97%, the yield at the manufacturing time of the honeycomb structure sometimes drops.

Next, a honeycomb structure of a second aspect of the present invention will be described (hereinafter sometimes referred to simply as "the second aspect"). An embodiment of the second aspect of the present invention can be shown in FIG. 1 in the same manner as in the first aspect. In the second aspect, as shown in FIG. 1, there is provided a honeycomb structure 1 comprising a plurality of cells 4. Each cell is surrounded by cell walls 2 and functions as a fluid passage. Predetermined cells 4 are plugged by a plugging material at one end face to form a plug portion 3. Remaining cells 4 are plugged by the plugging material at the other end face (not shown). A strength of the plugging material is lower than that of the cell wall 2. At one end face 6 and the other end face (not shown) of the honeycomb structure 1, the plugged cell and the open cell are arranged alternately so as to form checkerboard patterns at the end faces.

The strength of the plugging material is set to be lower than that of the cell wall 2 in this manner. Therefore, when the stress is added to the end face of the honeycomb structure 1, the cell wall is not pushed/broken by the plugging material because of the strength of the cell wall, the plugging material is distorted before the cell wall is cracked, the cell wall can be inhibited from being cracked, and durability can be enhanced. The examples of a case where the stress is added to the end face of the honeycomb structure 1 include: a case where a thermal stress due to a temperature difference or the like is added to the end face when heating the honeycomb structure to regenerate the structure by burning soot; a case where the thermal stress is generated in the end face by an influence of a temperature distribution in a firing furnace or heat generated by combustion of the pore forming agent or the like in a firing step during a manufacturing process; and the like. Even when the honeycomb structure is laid horizontally and fired with the longitudinal direction directed in a horizontal direction, a load of the plug portion is applied to the cell wall of the honeycomb structure, and the stress is sometimes added to the end face.

The honeycomb structure of the second aspect is preferably used in a case where the porosity of the cell wall is 46% or more. That is, the honeycomb structure of the second aspect is an invention which has been developed in order to solve a problem that the cell wall is easily cracked because of a high porosity of the cell wall of the honeycomb structure in recent years, and the invention brings about a large effect on a honeycomb structure in which the porosity is 46% or more and which is more easily cracked. The honeycomb structure of the second aspect is preferably used in a case where the thickness of the cell wall is 400 μm or less. When the thickness of the cell wall decreases, the cell wall is easily cracked. Therefore, a larger effect is brought about in the honeycomb structure whose cell wall has a thickness of 400 μm or less and is more easily cracked.

As a material for the cell wall 2, the same material of as that of the first aspect of the present invention is usable.

There is no particular restriction as to the shape of the honeycomb structure, and the structure may be formed in the same shape as that of the first aspect.

Moreover, the cell density of the cell formed by the cell wall may be set to be equal to that of the first aspect.

The porosity of the plugging material is preferably 97% or more of that of the cell wall 2. When the porosity is lower than 97%, the strength of the plugging material sometimes becomes higher than that of the cell wall 2. The porosity of the plugging material is further preferably 105% or more of that of the cell wall 2 so that the present invention becomes more effective.

As the plugging material, the same material of as that of the cell wall 2 is usable. When the plugging material is formed of a silicon carbide material, the end face of the honeycomb structure is sometimes cracked due to the high strength of the silicon carbide material itself. However, since the strength is lowered by the increase of the porosity or the like for use, the end face of the honeycomb structure can be inhibited from being cracked.

The length (depth) of the plug portion 3 in the longitudinal direction of the honeycomb structure can be set to be equal to that of the first aspect.

A method of manufacturing the honeycomb structure of the second aspect of the present invention will be described hereinafter.

In the same manner as in the first aspect of the present invention, a ceramic raw material, a pore forming agent, a surface active agent, water and the like are mixed, and subsequently kneaded using a vacuum kneading machine or the like to prepare clay having plasticity. Moreover, after the clay is extruded to prepare a formed body having a plurality of cell structures (honeycomb structures), the formed body is dried to prepare a ceramic formed body of the honeycomb structure.

As the type of the ceramic raw material, a desired (honeycomb structure forming) ceramic raw material is used. For example, when the honeycomb structure of silicon carbide is prepared, the mixture of SiC and metal Si powders is usable.

There is no particular restriction as to the type or added amount of the pore forming agent, but the same type or added amount as that of the first aspect of the present invention is usable. When the type or added amount of the pore forming agent is changed, the porosity or strength of the partition wall of the ceramic formed body (the cell wall of the honeycomb structure) can be controlled.

There is no particular restriction as to the type or added amount of the surface active agent, but the same type or added amount as that of the first aspect of the present invention is usable.

The added amount of water can be set to be equal to that of the first aspect of the present invention.

In addition to the ceramic raw material, pore forming agent, surface active agent, and water, the same additives as those of the first aspect of the present invention can be used.

In the same manner as in the first aspect of the present invention, the extrusion can be performed, for example, using the ram type extruder, twin screw type continuous extruder or the like. At the time of the extrusion, the formed body having the desired honeycomb structure can be prepared using the die having the desired cell configuration, cell wall thickness, and cell density.

There is no particular restriction as to the drying method of the formed body after extrusion, and the same method as that of the first aspect of the present invention can be used.

To obtain the raw material for the plugging material, in the same manner as in the first aspect of the present invention, a ceramic raw material, a pore forming agent, a surface active agent, water and the like can be mixed in the slurry, and subsequently kneaded using the mixer or the like.

The type of the ceramic raw material for use in the raw material for the plugging material may be the same as that of the first aspect of the present invention. The silicon carbide material is also usable as the raw material for the plugging material.

There is no particular restriction as to the type of the pore forming agent for use in the raw material for the plugging material, and the same type as that of the first aspect of the present invention is usable. When the type or added amount of the pore forming agent is changed, the porosity or strength of the plugging material can be controlled. The added amount of the pore forming agent is preferably 0.1 to 20 parts by mass with respect to 100 parts by mass of the ceramic raw material for use in the raw material for the plugging material.

The type of the surface active agent for use in the raw material for the plugging material may be the same as that of the first aspect of the present invention.

In addition to the ceramic raw material, pore forming agent, surface active agent, and water, the same raw material for the plugging material as that of the first aspect of the present invention is usable.

Next, the plug portion is formed so as to form the checkered patterns in the opposite end faces of the honeycomb structure in the same manner as in the first aspect of the present invention. The checkered patterns are preferably formed in the opposite end faces. However, even when the checkered patterns are not formed, the effect of the honeycomb structure of the present invention is fulfilled.

Moreover, there is no particular restriction as to the masking method, and the masking can be performed in the same method as that of the first aspect of the present invention. The same adhesive film as that of the first aspect of the present invention is preferably usable.

The ceramic formed body of the honeycomb structure whose opposite end faces are plugged in the checkered patterns is dried, degreased, and fired on conditions similar to those of the first aspect of the present invention to prepare the honeycomb structure of the present embodiment in which the end faces are plugged by the plugging material.

At the firing time, when the strength of the plugging material of the honeycomb structure is higher than that of the cell wall, and when the thermal stress due to the temperature difference at the firing time is generated in the end face of the honeycomb structure, the cell wall is sometimes cracked by the thermal stress because the cell wall has a low strength. Therefore, the strength of the plugging material needs to be lower than that of the cell wall.

Moreover, also when the dividing/multiplying of the plugging material is smaller than that of the cell wall at the firing time, the stress due to the difference of the dividing/multiplying is generated in the end face of the honeycomb structure, the partially concentrated stress is generated in the cell wall, and therefore the cell wall is sometimes cracked. Therefore, the strength of the plugging material needs to be set to be lower than that of the cell wall.

With respect to the yield at the manufacturing time in the manufacturing of the honeycomb structure of the present embodiment, the porosity of the plugging material is preferably 97% or more of that of the cell wall, further preferably 105% or more. When the porosity is lower than 97%, the yield at the manufacturing time of the honeycomb structure sometimes drops.

Next, a honeycomb structure of a third aspect of the present invention will be described (hereinafter sometimes referred to simply as "the third aspect"). An embodiment of the third aspect of the present invention can be shown in FIG. 1 in the same manner as in the first aspect. In the third aspect, as shown in FIG. 1, there is provided a honeycomb structure 1 comprising a plurality of cells 4. Each cell is surrounded by cell walls 2 and functions as a fluid passage. Predetermined cells 4 are plugged by a plugging material at one end face to form a plug portion 3. Remaining cells 4 are plugged by the plugging material at the other end face (not shown). A porosity of the plugging material is 97% or more with respect to a porosity of the cell wall 2. At one end face 6 and the other end face (not shown) of the honeycomb structure 1, the plugged cell and the open cell are arranged alternately so as to form checkerboard patterns at the end faces.

The porosity of the plugging material is set to 97% or more of that of the cell wall 2 in this manner. Therefore, the Young's modulus of the plugging material can be set to be lower than that of the cell wall 2, and further the strength of the plugging material can be set to be lower than that of the cell wall 2. Accordingly, when the stress is added to the end face of the honeycomb structure 1, the cell wall can be inhibited from being cracked in the same manner as in the first and second aspects, and the durability can be enhanced. The porosity of the plugging material is preferably 105% or more of that of the cell wall 2 so that the present invention becomes more effective. The examples of a case where the stress is added to the end face of the honeycomb structure 1 include: a case where a thermal stress due to a temperature difference or the like is added to the end face when heating the honeycomb structure to regenerate the structure by burning soot; a case where the thermal stress is generated in the end face by the influence of a temperature distribution in a firing furnace or heat generated by combustion of the pore forming agent or the like in the firing step during the manufacturing process; and the like. Even when the honeycomb structure is laid horizontally and fired with the longitudinal direction directed in the horizontal direction, the load of the plug portion is applied to the cell wall of the honeycomb structure, and the stress is sometimes added to the end face.

The honeycomb structure of the third aspect is preferably used in a case where the porosity of the cell wall is 46% or more. That is, the honeycomb structure of the third aspect is an invention which has been developed in order to solve a problem that the cell wall is easily cracked because of a high porosity of the cell wall of the honeycomb structure in recent years, and the invention brings about a large effect on a honeycomb structure in which the porosity is 46% or more and which is more easily cracked. The honeycomb structure of the third aspect is preferably used in a case where the thickness of the cell wall is 400 μm or less. When the thickness of the cell wall decreases, the cell wall is easily cracked. Therefore, a larger effect is brought about in the honeycomb structure whose cell wall has a thickness of 400 μm or less and is more easily cracked.

As a material for of the cell wall 2, the same material as that of the first aspect of the present invention is usable.

There is no particular restriction as to the shape of the honeycomb structure, and the structure may be formed in the same shape as that of the first aspect of the present invention.

Moreover, the cell density of the cell formed by the cell wall may be set to be equal to that of the first aspect of the present invention.

As the plugging material, the same material as that of the cell wall 2 is usable. When the plugging material is formed of the silicon carbide material, the end face of the honeycomb structure is sometimes cracked by the use of the silicon carbide material having a low porosity. However, when the porosity is raised for use, the end face of the honeycomb structure can be inhibited from being cracked.

The length (depth) of the plug portion 3 in the longitudinal direction of the honeycomb structure can be set to be equal to that of the first aspect of the present invention.

A method of manufacturing the honeycomb structure of the third aspect of the present invention will be described hereinafter.

In the same manner as in the first aspect of the present invention, a ceramic raw material, a pore forming agent, a surface active agent, water and the like are mixed, and subsequently kneaded using a vacuum kneading machine or the like to prepare clay having plasticity. Moreover, after the clay is extruded to prepare a formed body having a plurality of cell structures (honeycomb structures), the formed body is dried to prepare a ceramic formed body of the honeycomb structure.

As the type of the ceramic raw material, a desired (honeycomb structure forming) ceramic raw material is used. For example, when the honeycomb structure of silicon carbide is prepared, the mixture of SiC and metal Si powders is usable.

There is no particular restriction as to the type or added amount of the pore forming agent, but the same type or added amount as that of the first aspect of the present invention is usable. When the type or added amount of the pore forming agent is changed, the porosity of the partition wall of the ceramic formed body (the cell wall of the honeycomb structure) can be controlled.

There is no particular restriction as to the type or added amount of the surface active agent, but the same type or added amount as that of the first aspect of the present invention is usable.

The added amount of water can be set to be equal to that of the first aspect of the present invention.

In addition to the ceramic raw material, pore forming agent, surface active agent, and water, the same additives as those of the first aspect of the present invention can be used.

In the same manner as in the first aspect of the present invention, the extrusion can be performed, for example, using the ram type extruder, twin screw type continuous extruder or the like. At the time of the extrusion, the formed body having the desired honeycomb structure can be prepared using the die having the desired cell configuration, cell wall thickness, and cell density.

There is no particular restriction as to the drying method of the formed body after extrusion, and the same method as that of the first aspect of the present invention can be used.

To obtain the raw material for the plugging material, in the same manner as in the first aspect of the present invention, a ceramic raw material, a pore forming agent, a surface active agent, water and the like can be mixed in the slurry, and subsequently kneaded using the mixer or the like.

The type of the ceramic raw material for use in the raw material for the plugging material may be the same as that of the first aspect of the present invention. The silicon carbide material is also usable as the raw material for the plugging material.

There is no particular restriction as to the type of the pore forming agent for use in the raw material for the plugging material, and the same type as that of the first aspect of the present invention is usable. When the type or added amount of the pore forming agent is changed, the porosity of the plugging material can be controlled. The added amount of the pore forming agent is preferably 0.1 to 20 parts by mass with respect to 100 parts by mass of the ceramic raw material for use in the raw material for the plugging material.

The type of the surface active agent for use in the raw material for the plugging material may be the same as that of the first aspect of the present invention.

In addition to the ceramic raw material, pore forming agent, surface active agent, and water, the same raw material for the plugging material as that of the first aspect of the present invention is usable.

Next, the plug portion is formed so as to form the checkered patterns in the opposite end faces of the honeycomb structure in the same manner as in the first aspect of the present invention. The checkered patterns are preferably formed in the opposite end faces. However, even when the checkered patterns are not formed, the effect of the honeycomb structure of the present invention is fulfilled.

Moreover, there is no particular restriction as to the masking method, and the masking can be performed in the same method as that of the first aspect of the present invention. The same adhesive film as that of the first aspect of the present invention is preferably usable.

The ceramic formed body of the honeycomb structure whose opposite end faces are plugged in the checkered patterns is dried, degreased, and fired on the conditions similar to those of the first aspect of the present invention to prepare the honeycomb structure of the present embodiment in which the end faces are plugged by the plugging material.

At the firing time, when the porosity of the plugging material of the honeycomb structure is lower than 97% of that of the cell wall, and when the thermal stress due to the temperature difference at the firing time is generated in the end face of the honeycomb structure, the Young's modulus and strength of the cell wall become lower than those of the plugging material, and therefore the cell wall is sometimes cracked by the thermal stress. Therefore, the porosity of the plugging material needs to be 97% or more of that of the cell wall.

Moreover, also when the dividing/multiplying of the plugging material is smaller than that of the cell wall at the firing time, the stress due to the difference of the dividing/multiplying is generated in the end face of the honeycomb structure, the partially concentrated stress is generated in the cell wall, and therefore the cell wall is sometimes cracked. Therefore, the porosity of the plugging material needs to be 97% or more of that of the cell wall also in order to inhibit the cell wall from being cracked.

Also to enhance the yield at the manufacturing time in the manufacturing of the honeycomb structure of the embodiment of the third aspect of the present invention, the porosity of the plugging material is 97% or more of that of the cell wall, preferably 105% or more. When the porosity is lower than 97%, the yield at the manufacturing time of the honeycomb structure sometimes drops.

Examples

The present invention will concretely be described hereinafter in terms of examples, but the present invention is not limited to these examples.

As a ceramic raw material, an SiC powder and metal Si powder were mixed, starch and foamed resin were added as pore forming agents, and further methyl cellulose, hydroxypropoxyl methyl cellulose, a surface active agent, and water were added to prepare mixtures having compositions as shown in Table 1. These mixtures were kneaded by a vacuum kneading machine to prepare clay having plasticity. This clay was extruded in an extruder, and an obtained formed body was dried with microwaves and hot air to prepare formed bodies having honeycomb structures (formed body Nos. 1 to 3). In the obtained formed bodies having the honeycomb structure, a cell wall had a thickness of 310 μm, and a cell density of 46.5 cells/cm$^2$ (300 cells/square inch), a cross section was square with one side being 35 mm, and a length was 152 mm.

The porosity of a cell wall of the honeycomb structure was measured by a method of mercury penetration, and the porosity of the plugging material was measured by an Archimedes method.

The end face of the obtained honeycomb structure was observed with an optical microscope to check presence/absence of cracks. Results are shown in Table 3. Here, the cell wall refers to the cell wall of the honeycomb structure, "Plugging material low" indicates that, for example, a Young's modulus of the plugging material is lower than that of the cell wall, and "plugging material high" indicates that, for example, the Young's modulus of the plugging material is higher than that of the cell wall. Moreover, "porosity ratio (%) of plugging material with respect to cell wall" indicates a value obtained by multiplying a value obtained by dividing

TABLE 1

| Formed body No. | SiC powder average particle diameter (μm) | SiC powder blended amount (parts by mass) | Metal Si powder blended amount (parts by mass) | Pore forming agent blended amount (parts by mass) | Young's modulus (GPa) | Strength (MPa) | Porosity (%) |
|---|---|---|---|---|---|---|---|
| 1 | 33 | 80 | 20 | — | 20 | 26 | 46 |
| 2 | 33 | 80 | 20 | 10 | 15 | 20 | 50 |
| 3 | 33 | 80 | 20 | 15 | 7 | 10 | 60 |

Figure 2:
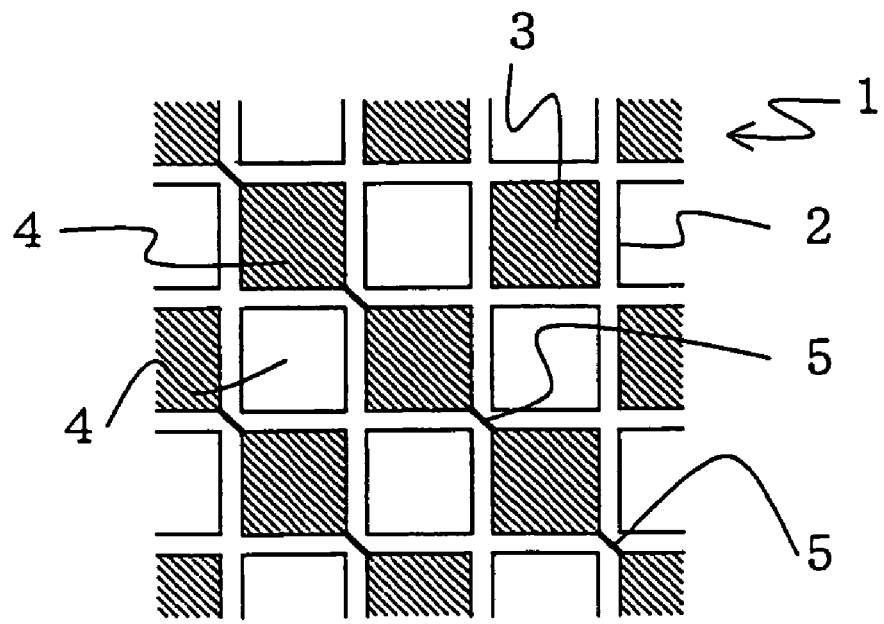
FIG. 2 is a plan view showing a part of an end face in an example of a conventional honeycomb structure.

As a ceramic raw material, an SiC powder and metal Si powder were mixed, foamed resin was added as a pore forming agent, and further methyl cellulose, polyethylene oxide, a surface active agent, and water were added to prepare mixtures having compositions as shown in Table 2. These mixtures were kneaded using a mixer for 30 minutes to obtain plugging material Nos. A to D.

the porosity of the plugging material by that of the cell wall by 100. It was assumed that when a state shown in FIG. 1 was confirmed, the end face was not cracked and that when a state shown in FIG. 2 was confirmed, the end face was cracked. Furthermore, "cracking frequency in end face (n=100)" indicates the number of honeycomb structures whose end faces were cracked in preparing 100 honeycomb structures of each

TABLE 2

| Plugging material No. | SiC powder average particle diameter (μm) | SiC powder blended amount (parts by mass) | Metal Si powder blended amount (parts by mass) | Pore forming agent blended amount (parts by mass) | Young's modulus (GPa) | Strength (MPa) | Porosity (%) |
|---|---|---|---|---|---|---|---|
| A | 10 | 80 | 20 | — | 16 | 14 | 46 |
| B | 12 | 80 | 20 | — | 5 | 7 | 58 |
| C | 12 | 80 | 20 | 3 | 1.5 | 1.5 | 63 |
| D | 12 | 80 | 20 | 5 | 1.1 | 1.1 | 70 |

Figure 3:
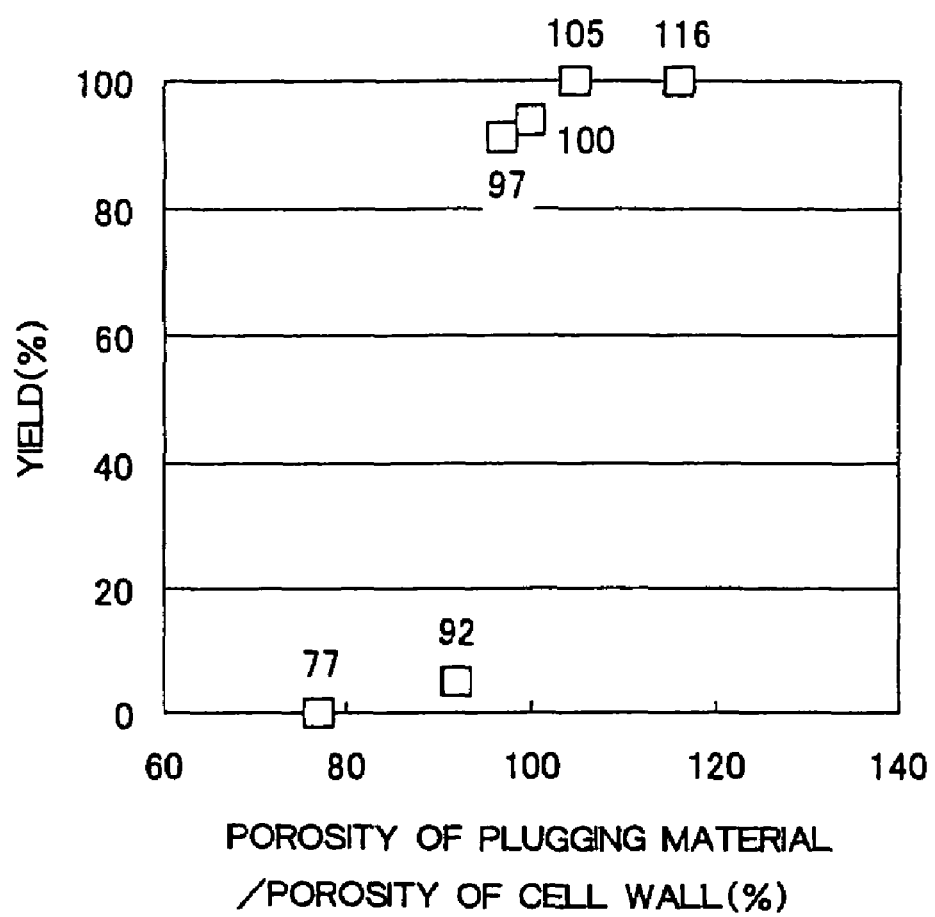
FIG. 3 is a graph showing a relation between "porosity of a plugging material/porosity of a cell wall" and "yield".

In each of the formed body Nos. 1 to 3, a cell having one end portion plugged and a cell having the other end portion plugged were alternately disposed, and predetermined cells were plugged with the plugging materials A to D so that the opposite end portions were plugged in the checkered patterns (combinations of the "formed body Nos. 1 to 3" and "plugging materials A to D" are shown in Table 3). Thereafter, the bodies were dried with microwaves and hot air, subsequently degreased at about 400° C. in the atmosphere, and thereafter fired at about 1450° C. in an Ar inert atmosphere to obtain Si coupled SiC honeycomb structures (Examples 1 to 10, Comparative Examples 1, 2).

of Examples 1 to 10, Comparative Examples 1, 2. The number of honeycomb structures in which any crack was not generated in preparing 100 structures for each is shown as a yield (value (%) obtained by dividing the number of honeycomb structures in which any crack was not generated by 100 which was a total number of prepared honeycomb structures and multiplying a divided value by 100) in FIG. 3. It is to be noted that FIG. 3 shows data concerning Examples 6, 8 to 10 and Comparative Examples 1, 2. In FIG. 3 "porosity of plugging material/porosity of cell wall (%)" indicates a value obtained by dividing the porosity of the plugging material by that of the cell wall and multiplying a divided value by 100.

TABLE 3

| | Formed body No. | Plugging material No. | Young's modulus comparison between cell wall and plugging material | Strength comparison between cell wall and plugging material | Porosity ratio (%) of plugging material to cell wall | Cracking frequency in end face (n = 100) |
|---|---|---|---|---|---|---|
| Example 1 | 1 | D | Plugging material low | Plugging material low | 152 | 0 |
| Example 2 | 2 | D | Plugging material low | Plugging material low | 140 | 0 |

TABLE 3-continued

| | Formed body No. | Plugging material No. | Young's modulus comparison between cell wall and plugging material | Strength comparison between cell wall and plugging material | Porosity ratio (%) of plugging material to cell wall | Cracking frequency in end face (n = 100) |
|---|---|---|---|---|---|---|
| Example 3 | 3 | D | Plugging material low | Plugging material low | 117 | 0 |
| Example 4 | 1 | C | Plugging material low | Plugging material low | 137 | 0 |
| Example 5 | 2 | C | Plugging material low | Plugging material low | 126 | 0 |
| Example 6 | 3 | C | Plugging material low | Plugging material low | 105 | 0 |
| Example 7 | 1 | B | Plugging material low | Plugging material low | 126 | 0 |
| Example 8 | 2 | B | Plugging material low | Plugging material low | 116 | 0 |
| Example 9 | 3 | B | Plugging material low | Plugging material low | 97 | 9 |
| Example 10 | 1 | A | Plugging material low | Plugging material low | 100 | 6 |
| Comparative Example 1 | 2 | A | Plugging material high | Plugging material high | 92 | 95 |
| Comparative Example 2 | 3 | A | Plugging material high | Plugging material high | 77 | 100 |

It is seen from Table 3 that when the Young's modulus of the plugging material is lower than that of the cell wall of the honeycomb structure, the strength of the plugging material is lower than that of the cell wall of the honeycomb structure, and the porosity of the plugging material of the honeycomb structure is 97% or more of that of the cell wall, a cracking frequency (n=100) in the end face of the honeycomb structure drops. The above-described embodiments simultaneously satisfy three conditions that the Young's modulus of the plugging material is lower than that of the cell wall of the honeycomb structure, the strength of the plugging material is lower than that of the cell wall of the honeycomb structure, and the porosity of the plugging material of the honeycomb structure is 97% or more of that of the cell wall. However, when at least one of these three conditions is satisfied, the cracking frequency in the end face of the honeycomb structure can be lowered.

In FIG. 3, when "porosity of plugging material/porosity of cell wall (%)" is lower than 97% (Comparative Examples 1, 2), a yield is very low. However, in Examples 9, 10 in which the ratio is 97% or more, the yield is rapidly enhanced, and in Examples 6, 8 in which the ratio is 105% or more, the yield is further enhanced to 100%. It is to be noted that even in Examples 1 to 5, 7, the yield was 100% in the same manner as in Examples 6, 8 (not shown).

INDUSTRIAL APPLICABILITY

As described above according to a honeycomb structure of the present invention (first, second, and third aspects), end faces are not easily cracked at a time of regenerating the structure by burning soot or a firing time, and the structure is superior in durability.

The invention claimed is:

1. A honeycomb structure comprising:
a plurality of cells, each cell being surrounded by cell walls and functioning as a fluid passage, predetermined cells being plugged by a plugging material at one end face, remaining cells being plugged by the plugging material at the other end face,
wherein a strength of the plugging material is lower than that of the cell wall, and
a porosity of the plugging material is 67% to 70%.

2. The honeycomb structure according to claim 1, wherein the porosity of the plugging material is 97% or more with respect to a porosity of the cell wall.
3. The honeycomb structure according to claim 1, wherein the porosity of the plugging material is 105% or more with respect to a porosity of the cell wall.
4. The honeycomb structure according to claim 1, wherein a porosity of the cell wall is 46% or more.
5. The honeycomb structure according to claim 1, wherein a thickness of the cell wall is 400 μm or less.
6. The honeycomb structure according to claim 1, wherein a material for the cell wall is porous ceramic.
7. The honeycomb structure according to claim 1, wherein the plugging material comprises silicon carbide.
8. The honeycomb structure according to claim 1, wherein the predetermined cells plugged at one end face and the remaining cells plugged at the other end face are arranged alternately so as to form checkerboard patterns at the end faces.
9. A honeycomb structure comprising:
a plurality of cells, each cell being surrounded by cell walls and functioning as a fluid passage, predetermined cells being plugged by plugging material at one end face, remaining cells being plugged by the plugging material at the other end face,
wherein a porosity of the plugging material is 97% or more with respect to a porosity of the cell wall,
the porosity of the plugging material is 67% to 70%.
10. The honeycomb structure according to claim 9, wherein the porosity of the plugging material is 105% or more with respect to the porosity of the cell wall.
11. The honeycomb structure according to claim 9, wherein the porosity of the cell wall is 46% or more.
12. The honeycomb structure according to claim 9, wherein a thickness of the cell wall is 400 μm or less.
13. The honeycomb structure according to claim 9, wherein a material for the cell wall is porous ceramic.
14. The honeycomb structure according to claim 9, wherein the plugging material comprises silicon carbide.
15. The honeycomb structure according to claim 9, wherein the predetermined cells plugged at one end face and the remaining cells plugged at the other end face are arranged alternately so as to form checkerboard patterns at the end faces.

* * * * *